May 10, 1938.  N. H. BROCK  2,116,747

METHOD AND APPARATUS FOR SOUND RECORDING

Filed Sept. 5, 1935

INVENTOR
NORMAN H. BROCK
BY
John E. Hubbell
ATTORNEY

Patented May 10, 1938

2,116,747

UNITED STATES PATENT OFFICE 2,116,747

METHOD AND APPARATUS FOR SOUND RECORDING

Norman H. Brock, Philadelphia, Pa.

Application September 5, 1935, Serial No. 39,214
Renewed October 8, 1937

18 Claims. (Cl. 179—100.3)

The primary object of the present invention is to provide an improved method of and apparatus for making a sound record on a photographic film for sound reproduction purposes. A more specific object of the present invention is to provide a method of, and apparatus for producing modulated light suitable for the purpose specified, in which the electric current output from the amplifying unit of an audio transmission system is employed to modulate the light emission from a gaseous discharge tube lamp devised by me for the purpose, and adapted to provide modulated light of sufficient intensity for transmission through a slit to a positive motion picture film coated with a standard photographic emulsion, directly, or preferably through an optical condensing system, and slit so as to operate on the straight line, or "correct exposure" portion of the well known H and D, or Hurter and Driffield, exposure curve for the film.

According to my information and belief, in the only methods of making sound records on a photographic film now in general commercial use, a variable amount of light from a constant light source, ordinarily a powerful incandescent electric lamp, is transmitted to the film through a shutter or reflector mechanism including electro-magnetic adjusting or actuating means. That mechanism is variably actuated by electric energizing currents created or modulated by a sound or audio frequency amplifier, to produce variations in the intensity of the light received by the film which are in more or less close correspondence with the frequency and magnitude variations in the amplifier currents. As is generally recognized, such mechanisms are open to practical objections from the mechanical standpoint, because of the light weight and delicate character of the vibrating shutter or reflector parts required to make them responsive to sound wave frequencies, and are open to the more serious objection that they are inherently incapable of suitable proportional responses to a suitably wide range of sound wave frequencies. That inherent and detrimental characteristic of such apparatus can be partially compensated or corrected for by the use of certain circuit compensating provisions, but those provisions add complications to the apparatus required and do not give as wide a frequency range as is desirable.

It has long been recognized that, by including sound wave created or modulated electric current components in the energizing current of a gaseous discharge tube lamp, sound wave frequency variations in the light emission of the lamp may be produced. For some years, considerable commerical use was made of sound reproducing apparatus, in which the modulated recording light was furnished by a type of gaseous discharge tube lamp known as the "Aeolight". Such apparatus is no longer in general commercial use, though still used to a limited extent for certain special purposes.

The practical abandonment of the Aeolight as a source of light for general sound recording purposes, was due, as I understand and believe, to the small brilliancy or intensity of light furnished by it. On that account, it was found practically necessary to work with the Aeolight, in the so-called "under exposure" region of the H and D curve. Working on that portion of the H and D curve is objectionable, because the density is not proportional to the logarithm of exposure as it is when the light intensity is sufficient to permit working on the straight line, or "correct exposure" portion of said curve. In the latter case, the light transmitted through the developed film is proportional to the light to which the film was exposed as is obviously desirable.

The gaseous discharge tube lamp which I have devised for the purposes of the present invention, is a so-called positive column lamp furnishing light of such intensity that even with the loss in light efficiency, inherent in the transmission of light from the lamp to the film through a slit and an optical condensing system, the exposure will be in the straight line or "correct exposure" region of the H and D curve. In the lamp which I have devised, the lamp envelope contains mercury and some easily ionized and inert gas or vapor. In practice, I have obtained excellent results when the gas or vapor, other than mercury, consists of neon and argon in amounts sufficient to create cold lamp vapor pressures of ten and two millimeters, respectively. The lamp which I have devised and use in accordance with the present invention, differs significantly from the "Aeolight", and also from prior positive column discharge lamps in which mercury and other gases, such as a mixture of neon and argon, have been employed, in that the current density in my lamp is very much higher than in such prior lamps. For example, I have obtained good results in practice with a lamp in which the light emission is from the positive column within an envelope passage of approximately four millimeters in diameter, and in which the current flow varies from about 1 ampere to about 2½ amperes, depending on the condition of the lamp. When the inner surface of the lamp envelope is clean and free from film, adequate light may be obtained with a current flow of about 1 ampere, but when a considerable film is allowed to accumulate on the inner surface of the lamp, the current required for the same light intensity may be as high as 2½ amperes. The above mentioned film can be removed from time to time as occasion permits, by externally heating the lamp. When the above mentioned lamp is operated with an energizing current of one ampere, the current density in the restricted portion of the lamp is eight amperes per centimeter. I obtain that working current flow through the lamp, moreover, with a moderate working voltage, which ordinarily varies from about 60 volts to 135 volts. According to my information and belief, in the above mentioned Aeolight lamp, the maximum lamp current has ordinarily been of the order of one twentieth of an ampere, and notwithstanding the fact that in the Aeolight, the length of the gas path was only a small fraction of the eight or ten centimeter path length between electrodes ordinarily provided in my lamp. The working voltage in the Aeolight lamp is ordinarily in the neighborhood of, and not greatly below four hundred volts. So far as I am aware, there has been no commercial use of a positive column lamp as a sound reproduction source of light. In the commercial use of positive column lamps for other purposes, the current density has been of the order of one ampere per square centimeter.

I believe that the unusually large current density which I employ, and the consequent brilliancy of light which I provide, is obtainable with the moderate voltage specified, as a result of the fact that the operating pressure and temperature of the mercury vapor are much higher in my lamp, than has heretofore been customary in gaseous discharge tube lamps, and in positive column lamps, in particular. In the practical use of my lamp, I operate with a temperature in the positive column portion of the lamp, furnishing the light used, which is so high that the surrounding lamp envelope, made of any ordinary glass customarily used in lamp envelopes, would quickly melt, with the resultant destruction of the lamp, if I did not subject the lamp envelope to a suitable special cooling action.

In practice, I have provided for the maintenance of the proper amount of mercury vapor in the operative portion of the lamp envelope during the lamp operation, by providing a mercury reservoir for mercury in excess of the amount necessarily vaporized, in a portion or extension of the lamp envelope, which is not significantly heated in the regular operation of the lamp, but which is heated in initially preparing the lamp for use, and thereafter when occasion requires, so as to vaporize mercury in the reservoir and thus suitably increase the mercury vapor pressure in the working portion of the lamp. In practice, I arrange the reservoir so that when the use of the lamp is interrupted and the lamp cools off, the mercury in the operating portion of the lamp will condense and form a mercury globule which is retained in that portion of the lamp, so that when the lamp is again started into operation it is ordinarily not necessary to heat up the reservoir.

In starting the lamp into operation, it has been my practice, however, to subject the lamp envelope to an initial heating effect sufficient to vaporize the mercury in the main portion of the lamp envelope, and particularly that which tends to collect in the constricted positive column portion of the lamp envelope, and then to subject the lamp to the ionizing action of a high voltage transformer, and then to connect the lamp terminals to a source of direct or rectified current at a voltage of four hundred volts or so, which is reduced as the lamps heat up, and the amperage increases, until the required current flow through the lamp is obtained with the normal working voltage of ninety volts or so.

In the normal sound recording use of the lamp, I impress the constant working voltage on the lamp terminals and also connect the latter to the output terminals of an audio amplifier, which may be of any usual type providing sufficient power for the current amplification required. In ordinary practice, I consider it preferable to so operate the amplifier, that with the maximum total light emission from the lamp, the film exposure will be that corresponding to a point on the H and D curve for the film below but adjacent the over exposure region of the curve, while the unmodulated light emission from the lamp will give a film exposure corresponding approximately to the midpoint of the straight or correct exposure portion of the curve. With this procedure, the effective modulating voltage can not be great enough to fully neutralize the constant working voltage and extinguish the lamp, and the minimum light emission will correspond to a point on the H and D curve for the film above, but adjacent, the under exposure region of the curve.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Figure 1:
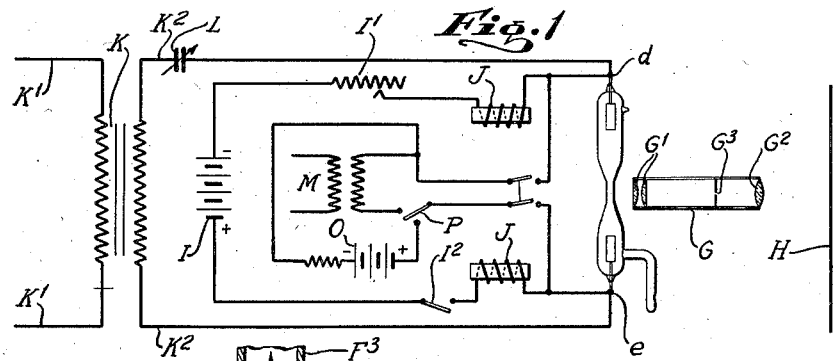
Fig. 1 is a diagrammatical representation of a sound recording system in which the lamp of Fig. 1 is used.

The lamp A shown in the drawing comprises a vertically disposed glass envelope having cylindrical end portions $A'$, a cylindrical central portion $A^2$, of much smaller diameter than the end portions $A'$, and funnel or conical portions $A^3$ connecting the larger cylindrical end portions to the constricted cylindrical central portion $A^2$. To conveniently and suitably support the lamp, I advantageously employ a glass supporting bar B alongside the lamp proper, and having transverse end portions $B'$ integrally connected to the sides of the end portions $A'$ of the envelope. A tubular extension C from the lower end portion $A'$ of the lamp, comprising a horizontally upper portion connected to the side of the lower end portion $A'$, and a depending lower portion, serves as a reservoir for a body of mercury $C^2$. The reservoir extension C advantageously has its bore restricted at $C'$ to such a small diameter that unvaporized mercury will be prevented from passing through it by surface tension action. This bore restriction $C'$ is advantageously located adjacent the top of the reservoir, as shown, as it restricts the passage of mercury vapor to the lower portion of the reservoir, and thereby reduces the vapor condensing action of the reservoir when the latter is cold.

The cathode D of the lamp is in the form of a vertically disposed open ended metal tube shown as axially arranged in the upper envelope end portion A'. At its upper end, the tube D is connected to a metallic cross bar portion D', preferably by welding, and is itself welded to, and supported by a tungsten wire terminal $d$ extending through, and sealed in, the upper end of the envelope. The anode E, located in the lower envelope end portion A', is exactly similar to the cathode D, in construction and in the manner in which it is supported, except that the anode cross bar E' is at the bottom of the cylindrical portion of the anode, and rests upon, instead of being suspended from, the anode terminal $e$ of tungsten wire which passes through and is sealed in the convex lower end of the lamp envelope.

As shown, the lamp A is mounted in a suitably shaped lamp housing F which may be formed of sheet metal, and which has bracket-like extensions F'' from one wall for detachable engagement with the bar B of the lamp. To avoid difficulties resulting from thermal expansion, the bar B should not be positively gripped by brackets F'', but should be free to slide in one of them. The housing F is provided with an inlet $F^2$ and an outlet $F^3$ for a lamp cooling fluid, which may be air or some suitable transparent liquid such as the oil known as "Nujol", and which may be circulated in any suitable manner as by means of an external blower or pump. Mounted in and projecting through one wall of the lamp housing F is the barrel or lens tube of an optical system G, preferably employed for the transmission of light from the restricted central portion $A^2$ of the lamp to the film to be exposed.

Figure 3:
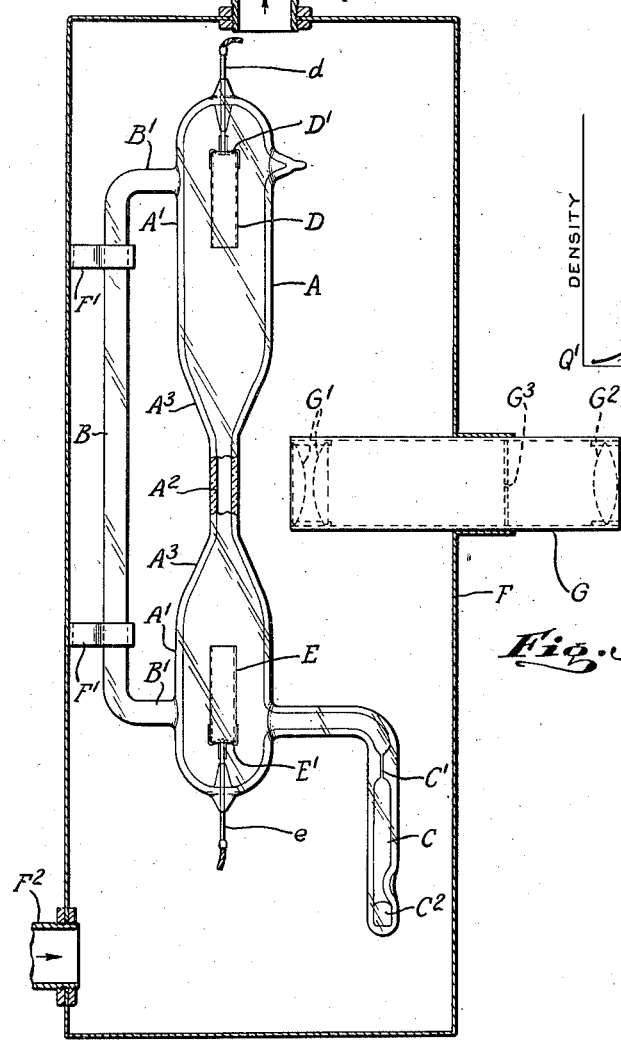
Fig. 3 is an elevation in section of a lamp and lamp housing.

As shown diagrammatically in Fig. 3, the optical system G comprises condensing lenses G' at the end of the lens tube adjacent the lamp portion $A^2$, which advantageously and as shown extends some distance above and below the levels of the top and the bottom of the lenses G'. The optical system also comprises a focusing lens $G^2$ at the opposite end of the lens tube, and suitably adjacent the film H to be exposed, and a partition extending across the lens tube and formed with a narrow slot $G^3$ may have a width or vertical dimension of about .007 cm., extending transversely to the direction of the film feed. With the described arrangement, as those skilled in the art will understand, the sound record on the film will be in the form of a band or strip extending longitudinally of the film adjacent one edge of the latter and of constant width, and of a density or capacity, after exposure and development of the film, varying in accordance with the variations in the intensity of the light emission of the lamp portion $A^2$.

The lamp circuit arrangements shown diagrammatically in Fig. 1, comprise a battery or other direct current source I, of suitable and suitably constant E. M. F. The terminals of the battery I are connected to the lamp terminals $d$ and $e$ through a regulating resistance I' which may be adjusted to provide an energizing lamp current giving the proper intensity of light emission. The energizing circuit including the battery I and resistance I', also includes choke coils J, and a control switch $I^2$, the portion of the resistance I' and other resistances in circuit when the lamp is in regular operation, preventing excessive lamp current as a result of the negative resistance of the gas flow path between the lamp electrodes. The lamp terminals $d$ and $e$ are also connected to an audio amplifier shown as comprising, in its output side, a transformer K, the secondary terminals $K^2$ of which are connected to the lamp terminals. The connections between the microphone (not shown), and the primary terminals K' of the transformer K, may follow the usual practice of the sound recording art, and hence need not be illustrated or described in detail. As shown, the circuit including the secondary of the transformer K and the lamp includes a condenser L, which may be a variable condenser. The condenser is especially useful in "matching" the impedance of the audio amplifier as is desirable for the optimum transfer of power from the amplifier to the lamp. To this end the condenser is adjusted relative to the total impedance in the amplifier output circuit to make that circuit resonant with a frequency which is approximately the mean of the audio frequencies amplified. The condenser also protects the amplifier against the current flow due to direct current lamp energizing provisions. The variable audio frequency voltages thus impressed on the lamp terminals through the transformer K, modulate the lamp energizing current and thereby the light emission of the lamp, as required for sound recording purposes.

The transformer M used in starting the lamp into operation, is adapted to impress a suitably high starting voltage, which may be 5,000 volts or so, on the lamp terminals when the switches N and P are suitably adjusted. After a suitable gas ionizing action has been initiated by the transformer M, which may be, and in my practice has been facilitated by externally heating the envelope, the switch P is operated to disconnect the transformer M from the lamp terminals, and to connect the latter to a source of direct or rectified current O, at a voltage which is substantially greater than that of the working source of current I, and may be about 400 volts. The starting source of current C should include or have associated with it means for preventing the current flow through the lamp created by it, from becoming excessive. For example, I can use, and have used, as the current source O, a so-called power pack of the sort employed in radio circuits, which is inherently incapable of delivering more current than can be safely passed through the lamp.

When the lamp attains its normal working condition, the color of the light emitted is the characteristic blue-white of light emitted by hot mercury vapor. As soon as the blue-white light emission is fully developed, the working source of direct current I may be connected to, and the source O disconnected from, the lamp terminals. The resistance I' is then adjusted to give the lamp current required for the proper intensity of light emission. As those skilled in the art will understand, in lieu of the separate current sources O and I, I may make use of a single regulable source of current adjustable to provide the high voltage of 400 volts or so required in starting the lamp into operation, and the required normal working voltage of 60 to 135 volts or thereabouts.

Figure 2:
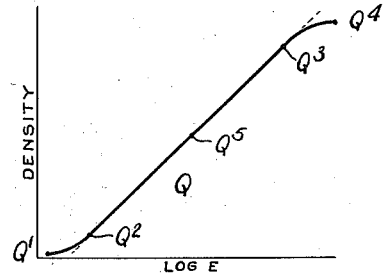
Fig. 2 is an exposure curve diagram.

The curve Q shown in Fig. 2 is the H and D curve for the film H, which may well be any standard positive emulsion motion picture film, such, for example, as the type "1301 Eastman" film. The portion of the curve between the points Q' and $Q^2$, is the so-called "under-exposure" or "toe" portion. The portion of the curve between the points $Q^3$ and $Q^4$, is the so-called "over-exposure" portion of the curve. In practice, I have preferred to adjust the resistance I' in response to the indication afforded by a photo-electric cell or other light meter (not shown), as required to make the intensity of light transmitted through the optical system G, approximately that required for the exposure of the film H by the unmodulated light, due to current flow from the source I, to an extent corresponding to the mid-point $Q^5$ of the exposure curve Q. In ordinary practice, the amplifier, including the transformer K which I employ, is preferably of such amplifying power that the maximum light emission due collectively to the source I and to the amplifier, will be that required for a film exposure represented by a point on the curve Q, between the points $Q^5$ and $Q^3$, and closely adjacent the latter point. In such case, the minimum light emission, when the lamp current effect of the amplifier directly opposes that due to the source I, will correspond to a point on the exposure curve between the points $Q^5$ and $Q^2$ and closely adjacent the last mentioned point.

With the apparatus shown, when correctly adjusted and operated, the variations in the intensity of the light emitted from the constricted portion $A^2$ of the lamp envelope, will accurately correspond to the voltage variations impressed on the amplifier. The apparatus is thus inherently adapted for a faithfulness of tone reproduction through the full tonal range, which is highly desirable, and which is inherently impossible of attainment with sound recording apparatus including an electro magnetic shutter or refractory mechanism, the operating range of which is necessarily restricted by its mechanical provisions, and, in particular, by the natural period of oscillation of the oscillating element of such mechanism.

As will be apparent to those skilled in the art, changes in the form and proportions of the apparatus shown in the drawing may be made, but by way of illustration and example, I note that I have obtained excellent practical sound recording results with a lamp of the precise form and proportions indicated in Fig. 1, in which the vertical distance between the top of the upper end portion A' and the bottom of the lower end portion $A^2$ is 18 centimeters, and in which the diameter of each cylindrical end portion A' is approximately 2½ cm., and in which the length of the constricted cylindrical portion $A^2$ is 2½ cm. and the diameter of its bore is 4 mm., and in which the electrode tubes D and E, were each of a length of 2½ cm. and of a diameter of 5 mm., and were each formed of sheet tantalum of a thickness of .03 mm. In that lamp, the distance between the top of the upper end portion A' and the top of the constricted portion $A^2$ was about 1 centimeter greater than the distance between the lower ends of the portion $A^2$ and of the lower end portion A'.

I have found it advantageous to make the converging connecting portions $A^3$ of the lamp envelope conical in form, rather than globular in form. For one thing, I have found that when the inner surfaces of those portions are concave, there is a tendency to an objectionable deposit of a mercury film and "dirt" thereon, which is largely avoided when the envelope sections $A^3$ are given the conical form shown in the drawing. In the construction of the lamp, the usual practices of the art may be followed in exhausting the envelope while heating the latter and the lamp terminals and electrodes to eliminate films on the inner wall of the envelope and occluded gases or "dirt" from the metal within the envelope. In regular operation, there is ordinarily no glow from the external surface of the cathode though there is a definitely visible glow in the interior of the cathode cylinder. The apparent luminosity of the lamp diminishes along the length of the lamp from each electrode toward the constricted central portion, but is much greater in said central portion than in any other portion of the lamp, the Faraday dark space being distinct and located close to the cathode.

I have found it possible to obtain light of the intensity required for sound recording purposes with the above described lamp under two operating conditions. In one of those conditions, the lamp voltage increases with the current, while with the other and preferable condition, the voltage decreases as the current increases and, generally speaking, is lower for the desired current intensity than with the first operating condition. According to my understanding and belief, in the condition in which the current increases with the voltage, there is an abnormal cathode potential drop, while in the second condition, there is a definite cathode spot development at some point on the inner surface of the cathode, and only a very small cathode potential drop, and the lamp resistance characteristic is definitely negative, instead of being definitely positive as it is in the first condition.

With the lamp dimensions specified, the first condition of operation ordinarily prevails when the lamp is being started into operation, but is unstable when the current intensity required for the working light emission is attained or approached, and the lamp operation may easily be changed from the first condition to the second condition by momentarily increasing the lamp current. The second condition of operation once attained, is quite stable for the normal working range, but by decreasing the current sufficiently, the lamp operation can be changed from the second condition to the first condition. While the lamp thus has a natural tendency to work with the first condition of operation when the lamp current is low, and with the second condition when the current is high, with a lamp having of the particular form and dimensions specified, there is what may be called a transition range of operation, in which the required light emission may be secured with either condition of the lamp operation, and in which the condition of operation actually prevailing depends upon the immediately preceding history of operation of the lamp.

While the lamp will operate in other conditions, I consider it preferable to operate the lamp or the cathode above the anode, as shown. So operated, the heat of the cathode, which is somewhat hotter than the anode, tends to drive any excess mercury into the lower portion of the envelope in vapor form, thereby avoiding operating disturbances due to the occasional accumulation of mercury in liquid form in the restricted portion $A^2$ of the envelope space. I consider it generally desirable to operate with as high an envelope temperature as is practically feasible, because I believe that high envelope temperatures contribute to stability of operation.

While I have found it practically possible to prevent the lamp envelope from softening as a result of the heat of operation, especially pronounced the portion $A^2$, by cooling the lamp with an air stream moving through the lamp housing, I believe a special advantage may be obtained by the use of a liquid, such as a transparent oil, as the lamp cooling agent. The tendency of such a cooling liquid to equalize the envelope temperatures, permits the cathode containing end portion A' to be kept somewhat hotter with a given maximum temperature of the envelope portion A², than is readily possible when the cooling agent is air. When the lamp cooling fluid is a liquid, and the operation is such as to maintain a liquid temperature in the housing F approaching the envelope external surface temperature, if the circulation of the cooling fluid is interrupted when the lamp operation is temporarily interrupted, the lamp may be kept hot enough for an appreciable period to permit re-starting without any special lamp heating procedure. When the cooling fluid is a liquid, the joints between the portions of the housing made readily separable to permit access to the lamp, must be packed to avoid leakage, but those skilled in the art will understand how to accomplish this with further explanation herein.

With a lamp envelope made of quartz, it is possible to obtain the required high mercury vapor temperature in the bore of the envelope portion A² without artificially cooling the envelope to prevent injurious overheating of the latter. While the present invention was primarily devised for sound record purposes, my invention may be used in producing modulated light for television and other purposes.

While in accordance with the provisions of the statutes, I have illustrated and described the best form of embodiment of my invention now known to me, it will be apparent to those skilled in the art that changes may be made in the form of the apparatus and procedure described in detail, without departing from the spirit of my invention as set forth in the appended claims and that in some cases certain features of my invention may be used to advantage without a corresponding use of other features.

Having now described my invention, what I claim as new and desire to secure by Letters Patent, is:

1. In apparatus for producing modulated light for making a sound record on a motion picture film, a gaseous discharge tube lamp comprising an envelope having an intermediate portion of small cross section and end portions of larger cross section and metal electrodes in said end portions, said envelope containing an inert easily ionizable gas and mercury vapor which under normal working conditions and with moderate voltages impressed on said electrodes is at a temperature and under the pressure required for a lamp current flow creating light emission from said intermediate envelope portion sufficiently intense for the exposure of a standard positive emulsion motion picture film to an extent corresponding to the straight line portion of the H and D curve for the film, and means for impressing a constant direct current electromotive force on said electrodes, and amplifying means for impressing audio frequency voltages on said electrodes.

2. In apparatus for producing light modulated in accordance with variations in alternating currents, a gaseous discharge tube lamp comprising an envelope having an intermediate portion of small cross section, and end portions of larger cross section, and containing easily ionizable inert gas, and mercury vapor which under normal lamp working conditions is at a temperature and under a pressure sufficiently high for the flow of current a lamp large enough to soften the envelope, if made of glass ordinarily used for the purpose, unless said envelope is artificially cooled, metallic electrodes in said end portions, means for creating such a lamp current flow comprising means for impressing a constant direct current electromotive force on said electrodes, and means for impressing light modulating alternating electromotive forces on said electrodes.

3. In apparatus for producing light modulated in accordance with variations in alternating currents, a gaseous discharge tube lamp comprising an envelope having an intermediate portion of small cross section, and end portions of larger cross section, and containing easily ionizable inert gas, and mercury vapor which under normal lamp working conditions is at a temperature and under a pressure sufficiently high for the flow of current a lamp large enough to soften the envelope, if made of glass ordinarily used for the purpose, unless said envelope is artificially cooled, metallic electrodes in said end portions, means for creating such a lamp current flow comprising means for impressing a constant direct current electromotive force on said electrodes, and means for impressing light modulating alternating electromotive forces on said electrodes, and means for cooling said envelope.

4. In apparatus for producing modulated light for making a sound record on a motion picture film, a gaseous discharge tube lamp comprising an envelope having an intermediate cylindrical portion of small diameter and end portions of larger diameter having refractory metal electrodes in said end portions, said envelope enclosing mercury vapor which at the temperature and pressure of normal operation is sufficient for an electric current flow through the vapor within said intermediate portion of the envelope at a current density of not less than eight amperes per square centimeter when a direct current electromotive force which is of the moderate order of one hundred volts is impressed on said electrodes, means for impressing such an electromotive force on said electrodes and sound amplifying means for impressing audio frequency voltages on said electrodes to thereby modulate the current flow in and light emission from the lamp.

5. In apparatus for producing light modulated in accordance with variations in alternating currents, a gaseous discharge tube lamp comprising an envelope having an intermediate cylindrical portion of small diameter and a length several times its diameter, end portions substantially larger in cross section than said cylindrical portion, and a conical intermediate portion at each end of said central portion and each connecting the latter to the adjacent end portion, a cathode in one of said end portions, and an anode in the other of said end portions, said envelope containing mercury and an inert readily ionizable gas.

6. In apparatus for producing light modulated in accordance with variations in alternating currents, a gaseous discharge tube lamp comprising a vertically disposed envelope having an intermediate portion of small cross section and end portions of larger cross section, a metallic cathode in one end portion, an anode in the other end portion, a tubular reservoir extension from the lower end portion including a lower depending portion and having a capillary bore restriction in and adjacent the upper end of said depending portion, mercury in said reservoir below said constriction, whereby when said reservoir is heated, mercury vapor is generated and passes into the body portion of the envelope, and an inert readily ionizable gas in said envelope.

7. In apparatus for producing light modulated in accordance with variations in alternating currents, a gaseous discharge tube lamp comprising an envelope having an intermediate portion of small cross section, and end portions of larger cross section and containing easily ionizable inert gas and mercury vapor which, under normal lamp conditions, is at a temperature and under a pressure sufficiently high for the flow of a lamp current large enough to soften the envelope if made of glass ordinarily used for the purpose and not artificially cooled, metallic electrodes in said end portion, and means for creating such a lamp current flow comprising means for impressing a constant direct current electromotive force on said electrodes, and thermionic amplifying means, circuit connection means between the output terminal of said amplifying means and said electrodes, and a variable condenser included in said connections.

8. In recording sound on a standard emulsion position motion picture film, the method which consists in exposing the film to modulated light emitted through the envelope of a positive column lamp from mercury vapor therein, and producing the light emitted by current flow through the lamp due to the voltages impressed on the lamp by an audio amplifier and by a source of constant electric motive force of moderate voltage, while maintaining the temperature and pressure of the mercury vapor high enough for the maintenance by said constant source of a current density in the light emitting portion of the lamp resulting in the emission of light of the intensity required for the exposure of a standard emulsion positive motion picture film to an extent corresponding approximately to the midpoint of the H and D curve for the film.

9. In recording sound on a motion picture film, the method which consists in exposing the film to modulated light emitted through a portion of the glass envelope of a positive column lamp containing an inert readily ionizable gas and mercury vapor and producing the light emitted by impressing audio amplifier voltages and a constant electromotive force on said lamp while maintaining the temperature and pressure of the mercury vapor high enough for the maintenance by said constant electromotive force of a density of current flow in the light emitting portion of the lamp of not less than eight amperes per square centimeter, whereby the intensity of the modulated light emitted through said portion of the envelope is sufficient for the exposure of a standard emulsion positive motion picture film to a variable extent within the straight line or correct exposure region of the H and D curve for the film.

10. In recording sound on a standard positive emulsion motion picture film, the method which consists in the audio amplifier modulation of the energizing current of a positive column gas discharge lamp comprising a glass envelope containing a readily ionizable inert gas and mercury vapor, and the transmission of light to the film from a portion of the envelope in which the unmodulated light emission is produced by an unmodulated current flow of a density of not less than eight amperes per square centimeter.

11. In recording sound on a standard positive emulsion motion picture film, the method which consists in the audio amplifier modulation of the energizing current of a positive column gas discharge lamp comprising a glass envelope containing a readily ionizable inert gas and mercury vapor, and the transmission of light to the film from a portion of the envelope in which the unmodulated light emission is produced by an unmodulated current flow of a density of not less than eight amperes per square centimeter, and artificially cooling the lamp envelope to avoid overheating said envelope.

12. In recording sound on a motion picture film, the method which consists in exposing the film to modulated light emitted through a portion of the glass envelope of a positive column lamp containing an inert readily ionizable gas and mercury vapor and producing the light emitted by impressing a constant electromotive force of about ninety volts or less and sound amplifier voltages on said lamp, while maintaining the temperature and pressure of the mercury vapor high enough for the maintenance by said constant electromotive force of a density of current flow in the light emitting portion of the lamp of not less than eight amperes per square centimeter, whereby the intensity of the modulated light emitted through said portion of the envelope is sufficient for the exposure of a standard positive emulsion positive motion picture film to a variable extent within the straight line or correct exposure region of the H and D curve for the film.

13. In apparatus for producing light modulated in accordance with variations in alternating currents, a gaseous discharge tube lamp comprising an envelope having an intermediate portion of small cross section, and end portions of larger cross section and containing easily ionizable inert gas and mercury vapor which, under normal lamp conditions, is at a temperature and under a pressure sufficiently high for the flow of a lamp current large enough to soften the envelope if made of glass ordinarily used for the purpose and not artificially cooled, metallic electrodes in said end portion, and means for creating such a lamp current flow comprising means for impressing a constant direct current electromotive force on said electrodes, and thermionic amplifying means, circuit connection means between the output terminal of said amplifying means and said electrodes, and a variable condenser included in said connections and adjusted relative to the total impedance in the amplifier output circuit to make that circuit resonant with an amplifier frequency which is approximately the mean of the frequencies of the currents amplified.

14. In apparatus for producing light modulated in accordance with variations in alternating currents, a gaseous discharge tube lamp comprising an envelope having an intermediate portion of small cross section, and end portions of larger cross section, and containing easily ionizable inert gas, and mercury vapor which under normal lamp working conditions is at a temperature and under a pressure sufficiently high for the flow of a lamp current large enough to soften the envelope, if made of glass ordinarily used for the purpose, unless said envelope is artificially cooled, metallic electrodes in said end portion, means for creating such a lamp current flow comprising means for impressing a constant direct current electromotive force on said electrodes, means for impressing light modulating alternating electromotive forces on said electrodes, a housing enclosing said lamp and adapted to pass light from said intermediate envelope portion, and means for the passage of a lamp cooling fluid through said housing.

15. In apparatus for producing light modulated in accordance with variations in alternating currents, a gaseous discharge tube lamp comprising an envelope having an intermediate portion of small cross section, and end portions of larger cross section, and containing easily ionizable inert gas, and mercury vapor which under normal lamp working conditions is at a temperature and under a pressure sufficiently high for the flow of a lamp current large enough to soften the envelope, if made of glass ordinarily used for the purpose, unless said envelope is artificially cooled, metallic electrodes in said end portion, means for creating such a lamp current flow comprising means for impressing a constant direct current electromotive force on said electrodes, means for impressing light modulating alternating electromotive forces on said electrodes, a housing enclosing said lamp and adapted to pass light from said intermediate envelope portion, and means for the passage of a transparent lamp cooling liquid through said housing.

16. In apparatus for producing light modulated in accordance with variations in alternating currents, a gaseous discharge tube lamp comprising an envelope having an intermediate portion of small cross section, and end portions of larger cross section, and containing easily ionizable inert gas, and mercury vapor which under normal lamp working conditions is at a temperature and under a pressure sufficiently high for the flow of a lamp current large enough to soften the envelope, if made of glass ordinarily used for the purpose, unless said envelope is artificially cooled, metallic electrodes in said end portion, means for creating such a lamp current flow comprising means for impressing a constant direct current electromotive force on said electrodes, means for impressing light modulating alternating electromotive forces on said electrodes, a housing enclosing said lamp, an optical system associated with said lamp and including a lens tube mounted and extending through said housing and extending away from, and having its inner end adjacent said intermediate envelope portion, and means for the passage of a lamp cooling fluid through said housing.

17. In recording sound on a motion picture film, the method which consists in the audio-amplifier modulation of the energizing current of a positive column gas discharge lamp comprising an envelope containing a readily ionizable gas and mercury vapor, an anode and a cathode, and comprising a constricted portion between said anode and cathode which has an internal bore of approximately 4 mm., diameter passing an unmodulated current through said lamp of not less than about one ampere, and exposing the film to light emitted laterally through said portion of the envelope.

18. In apparatus for making a sound record on a motion picture film, a gaseous discharge tube lamp comprising an envelope having a restricted intermediate portion with a bore of about 4 mm. diameter, and having enlarged end portions, said envelope containing an inert easily ionizable gas and mercury vapor, a metal anode in one of said portions, and a cold metal cathode in the other end portion, means for maintaining an unmodulated electric current flow between said anode and cathode of not less than about one ampere, audio-amplifying means for modulating the current flow between said anode and cathode, and means for exposing said film to the light emitted laterally from said restricted envelope portion.

NORMAN H. BROCK.